US006983273B2

(12) United States Patent
Banerjee et al.

(10) Patent No.: US 6,983,273 B2
(45) Date of Patent: Jan. 3, 2006

(54) ICONIC REPRESENTATION OF LINKED SITE CHARACTERISTICS

(75) Inventors: Dwip N. Banerjee, Austin, TX (US); Michael A. Paolini, Austin, TX (US); Kumar Ravi, Cedar Park, TX (US); Eduardo N. Spring, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 569 days.

(21) Appl. No.: 10/185,712

(22) Filed: Jun. 27, 2002

(65) Prior Publication Data

US 2004/0002962 A1 Jan. 1, 2004

(51) Int. Cl.
    *G06F 17/30* (2006.01)
(52) U.S. Cl. .......................... 707/3; 707/10; 707/102; 709/225
(58) Field of Classification Search .................. 707/3, 707/1, 10, 102; 709/225
    See application file for complete search history.

(56) References Cited

U.S. PATENT DOCUMENTS

| | | | |
|---|---|---|---|
| 5,420,968 A | 5/1995 | Johri | 345/619 |
| 5,515,488 A | 5/1996 | Hoppe et al. | 345/440 |
| 5,546,529 A | 8/1996 | Bowers et al. | 345/848 |
| 5,636,350 A | 6/1997 | Eick et al. | 345/440 |
| 5,693,964 A | 12/1997 | Ohta et al. | 257/194 |
| 5,721,900 A | 2/1998 | Banning et al. | 707/4 |
| 5,848,418 A * | 12/1998 | de Souza et al. | 707/102 |
| 5,873,080 A | 2/1999 | Coden et al. | 707/3 |
| 5,886,698 A | 3/1999 | Sciammarella | 345/769 |
| 6,151,624 A | 11/2000 | Teare et al. | 709/217 |
| 6,181,838 B1 | 1/2001 | Knowlton | 382/305 |
| 6,240,423 B1 | 5/2001 | Hirata | 707/104.1 |
| 6,317,739 B1 | 11/2001 | Hirata et al. | 707/4 |
| 6,336,116 B1 | 1/2002 | Brown et al. | 707/10 |
| 6,353,448 B1 | 3/2002 | Scarborough et al. | 345/744 |
| 6,356,908 B1 * | 3/2002 | Brown et al. | 707/10 |
| 6,606,659 B1 * | 8/2003 | Hegli et al. | 709/225 |
| 2002/0038299 A1 | 3/2002 | Zernik et al. | |
| 2003/0009495 A1 * | 1/2003 | Adjaoute | 707/501.1 |
| 2003/0217034 A1 * | 11/2003 | Shutt | 707/1 |

OTHER PUBLICATIONS

Wynblatt, M. et al., "Web Page Caricatures: Multimedia Summaries for WWW Documents," Proceedings. IEEE International conference on Multimedia Computing and systems, pp. 194-199, Publication Date: 1998.

Anonymous, "Search Result Advertisements," Research Disclosures, Jan. 200, No. 429, Article 147.

* cited by examiner

*Primary Examiner*—Mohammad Ali
*Assistant Examiner*—Kuen S. Lu
(74) *Attorney, Agent, or Firm*—Robert H. Frantz; Mark S. Walker

(57) ABSTRACT

Search results for linked sources of information are associated with one or more predefined symbols or icons that indicate characteristics of the linked sites' contents. Site content ratings services and databases are co-opted to obtain additional site characteristic opinion, review results, and indicators. A search engine creates a set of characteristic factors associated with its index of web sites, and when providing a site reference as a result of a search operation, includes icons and symbols to indicate the characteristics to a user. Further sorting, filtering and searching according to the user's preferences may be performed.

20 Claims, 8 Drawing Sheets

(d)

(g)

(c)

(f)

(b)

(e)

(a)

ICONIC REPRESENTATION OF LINKED SITE CHARACTERISTICS

CROSS-REFERENCE TO RELATED APPLICATIONS (CLAIMING BENEFIT UNDER 35 U.S.C. 120)

Not applicable.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

Not applicable.

BACKGROUND OF THE INVENTION

1. Field of the Invention

This invention relates to the fields of classification, categorization, sorting and filtering of linked sites to a web document such as a search results page. The invention relates especially to systems and methods for visually enhanced presentation of linked sites and web objects using iconic characteristic representations.

2. Background of the Invention

The Internet and general purpose search engines are well known in the art. A "web surfer" may access a search engine, such as Yahoo! ™or Google™, using his or her browser device. The browser device may be any networked computing platform ranging from a personal computer equipped with a browser such as Netscape's Navigator™ or Microsoft's Internet Explorer™, to a portable device such as a personal digital assistant ("PDA") equipped with a wireless network interface and a microbrowser program. Wireless telephones such as Personal Communications Systems ("PCS") telephones as well as some television set-top devices (e.g. WebTV) may be used to browse the Internet, as well.

Generally, these search engines work on one of a few premises. Initially, the operator or owner of a web site server submits the new site to each search engine for indexing, "spidering" or "crawling". The submitter may also indicate certain keywords, descriptive phrases, or categories which the submitter believes is appropriate for the site content. In some cases, the search engine's indexing operation is completely automatic, and the web site is added to the engine's categories and keyword lists as suggested and as determined by analysis of the content of the submitted site (e.g. word frequency analysis, hyper text header tags, etc.). Some other search engines provide for manual review and categorization of the site, as well.

Periodically, a web site server operator may resubmit the site for indexing, spidering or crawling to include updates and additions to the site. Some sites also provide for periodically reviewing the site content without initiation or submission by the site operator.

The result, then, is an index maintained by the search engine which is more or less current as to the content of each site which has been submitted to the search engine. When a web surfer accesses the search engine, he or she may search by keywords, phrases, or categories. For example, a surfer may search for sites based on the keywords "childhood" and "medical treatments", or a search may be made through a hierarchical arrangement of categories, as shown in Table 1. Each indexed web site may appear in one or more categories, and may be included in the results of a many different sets and combinations of keyword searches.

TABLE 1

Example Subject Hierarchy for Search Engine Index

> Health and Personal Care
>> Exercise and Fitness
>>> Aerobic Exercise
>>> Muscle and Body Building
...
>> Medical, Illness and Disease
>>> Adult Medical
>>> Youth Medical
>>> Geriatrics
>>> Women's Heath
>>> Men's Health
...
...

If a web surfer performs a keyword search, such as looking for sites containing the keywords "childhood" and "medical treatments", a results "page" is provided by the search engine to the web surfer which typically includes a short description of each site (or the first few words for the site's main page), a hyperlink to each site's web server, and a relevance ranking, as shown in Table 2.

TABLE 2

Example Keyword Search Results

Results of keyword search: childhood, medical treatments (1) "American Pediatrics Organization" - A web site for professional collaboration regarding pediatric practices, research . . . www.apo-sample.org (cached) 98%
(2) Help for new parents - A survival guide to childhood diseases, colds, and infections... www.kidkolds.org 94%
(3) Doctor speak made easy - What did my doctor actually say about my child's condition? Plain-english medical terminology . . . www.plain-meds4kids.com (cached) 82%
(4) Discount Children's Medical Source - online, virtual community of parents united to purchase health goods at a discount . . . www.DCMS-Group.com (cached) 78%
(5) Prescription and surgical alternatives for childhood ailments - holistic resources for parents . . . www.holistic-youth-meds.org 52%

To provide this search results page to the web surfer, the search engine is equipped with a software means to dynamically generate a "page" containing the search results and links to the sites listed, using a page definition language which allows for embedding linking such as Hyper Text Markup Language ("HTML") or Wireless Markup Language ("WML). Methods and systems to transmit such pages from a server to a browser client include Hyper Text Transfer Protocol ("HTTP") and Wireless Application Protocol ("WAP"), among others. The methods and systems are well known in the art, and are readily available in software packages for web servers and search engines.

Some existing technologies attempt to enhance the perceptibility of these results pages using graphics, such as bar graphs or pie charts indicating the relevance factor, or small "thumbnail" images representing each linked web page. Other search sites provide a small icon next to each search result item which indicates if the linked site has available images, such as the United States Patent and Trademark Office's patent database search engine. While these methods do provide some increase in the comprehensibility of the results page, they generally do not represent all of the site factors which may be of interest or dislike to the web surfer.

For example, a particular web surfer using a wireless device (e.g. cell phone or PDA) may not be interested in "visiting" sites which are slow to load. Another web surfer may not want to visit sites which spawn multiple windows or browser frames such as sites which use Java Script, or which use cookies or other forms of anonymous session tracking.

Yet another web surfer may not want to waste time clicking through to sites which require a subscription and/or login and password. Other web surfers may prefer sites which have been "quality checked" or verified by third parties for privacy and security, or prefer sites which are operated by government and institutional entities.

Much of these characteristics could be determined by analysis of each site contents, such as Java Script code to spawn browser frames, HTML which deposits or retrieves cookies, HTML which provides login forms, links to graphics "seals" of approval of third party sites, and keywords which indicate adult or family-friendly subject matter. Other characteristics may be determined manually, such as by search engine administrator review or by cooperative surfer feedback (e.g. a surfer who visits a linked site may provide feedback to the search engine that it is slow, or that it is a "spoof" of a family-friendly site which actually contains adult material).

However, to date, no technology is available to allow characterization and presentation in such ways of linked web sites. Therefore, there is a need in the art for a method and system for characterizing linked site content, providing a readily comprehensible summary of such site characterization in a list of linked sites, and providing for additional filtering and sorting of such a list based upon user preferences.

BRIEF DESCRIPTION OF THE DRAWINGS

The following detailed description when taken in conjunction with the figures presented herein provide a complete disclosure of the invention.

SUMMARY OF THE INVENTION

A system and method for displaying search results in conjunction with a predefined set of symbols or icons that indicate characteristics of linked web sites' contents. Site content ratings services and databases are co-opted to obtain additional site characteristic opinion, review results, and indicators. A search engine creates a set of characteristic factors associated with its index of web sites, and when providing a site reference as a result of a search operation, includes icons and symbols to indicate the characteristics to a user. In an enhanced embodiment, further sorting, filtering and searching according to the user's preferences may be performed.

DETAILED DESCRIPTION OF THE INVENTION

The present invention is preferably realized in conjunction with a computing platform functioning as a web search engine server. Many such computing platforms exist which are suitable for realization of the invention, including but not limited to:

(a) computers: IBM-compatible personal computers, Sun web servers, IBM Enterprise Servers, and micro-servers;

(b) operating systems: IBM's AIX, Linux, Sun Microsystem's Solaris, Microsoft's Windows, and Unix; and (c) HTTP Server Suites: IBM's WebSphere, Apache, etc.

Figure 1:
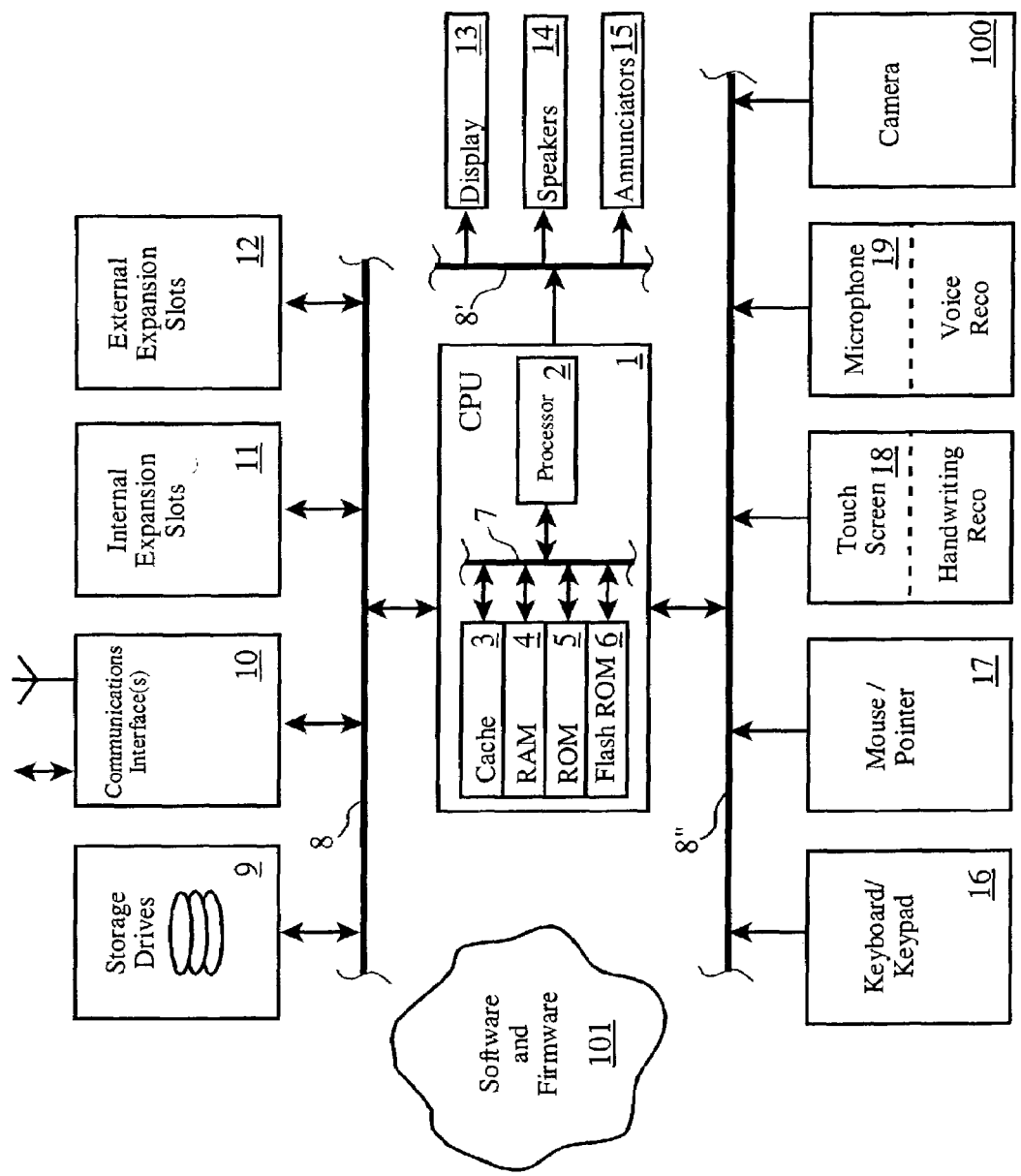
FIG. 1 depicts a generalized computing platform architecture, such as a personal computer, server computer, personal digital assistant, web-enabled wireless telephone, or other processor-based device.

As such, the generalized computing platform architecture as shown in FIG. 1 represents a wide array of suitable hardware, including enterprise servers, personal computers, and portable computing platforms, such as personal digital assistants ("PDA"), web-enabled wireless telephones, and other types of personal information management ("PIM") devices.

A generalized architecture is includes a central processing unit (1) ("CPU"), which is typically comprised of a microprocessor (2) associated with random access memory ("RAM") (4) and read-only memory ("ROM") (5). Often, the CPU (1) is also provided with cache memory (3) and programmable FlashROM (6). The interface (7) between the microprocessor (2) and the various types of CPU memory is often referred to as a "local bus", but also may be a more generic or industry standard bus.

Many computing platforms are also provided with one or more storage drives (9), such as a hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (10), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement (IrDA) interface, too.

Computing platforms are often equipped with one or more internal expansion slots (11), such as Industry Standard Architecture (ISA), Enhanced Industry Standard Architecture (EISA), Peripheral Component Interconnect (PCI), or proprietary interface slots for the addition of other hardware, such as sound cards, memory boards, and graphics accelerators.

Additionally, many units, such as laptop computers and PDA's, are provided with one or more external expansion slots (12) allowing the user the ability to easily install and remove hardware expansion devices, such as PCMCIA cards, SmartMedia cards, and various proprietary modules such as removable hard drives, CD drives, and floppy drives.

Often, the storage drives (9), communication interfaces (10), internal expansion slots (11) and external expansion slots (12) are interconnected with the CPU (1) via a standard or industry open bus architecture (8), such as ISA, EISA, or PCI. In many cases, the bus (8) may be of a proprietary design.

A computing platform is usually provided with one or more user input devices, such as a keyboard or a keypad (16), and mouse or pointer device (17), and/or a touch-screen display (18). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (18) is usually provided, often with handwriting recognition capabilities.

Additionally, a microphone (19), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (100), such as a still digital camera or full motion video digital camera.

One or more user output devices, such as a display (13), are also provided with most computing platforms. The display (13) may take many forms, including a Cathode Ray Tube ("CRT"), a Thin Flat Transistor ("TFT") array, or a simple set of light emitting diodes ("LED") or liquid crystal display ("LCD") indicators.

One or more speakers (14) and/or annunciators (15) are often associated with computing platforms, too. The speakers (14) may be used to reproduce audio and music, such as the speaker of a wireless telephone or the speakers of a personal computer. Annunciators (15) may take the form of simple beep emitters or buzzers, commonly found on certain devices such as PDAs and PIMs.

These user input and output devices may be directly interconnected (8', 8") to the CPU (1) via a proprietary bus structure and/or interfaces, or they may be interconnected through one or more industry open buses such as ISA, EISA, PCI, etc.

The computing platform is also provided with one or more software and firmware (101) programs to implement the desired functionality of the computing platforms.

Figure 2:
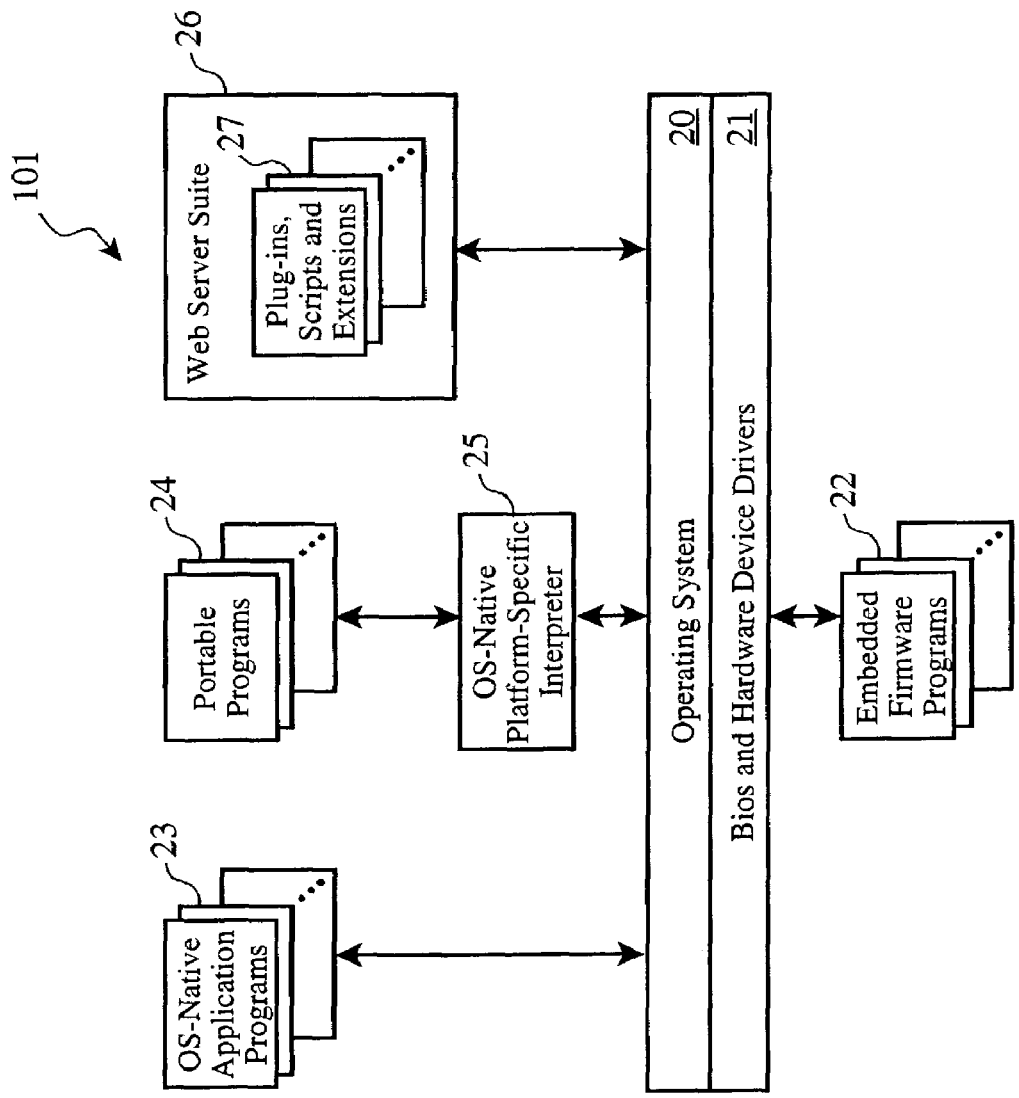
FIG. 2 shows a generalized organization of software and firmware associated with the generalized architecture of FIG. 1.

Turning to now FIG. 2, more detail is given of a generalized organization of software and firmware (101) on this range of computing platforms, especially in the case of a web server. One or more operating system ("OS") native application programs (23) may be provided on the computing platform, such as word processors, spreadsheets, system management utilities, etc.

Additionally, one or more "portable" or device-independent programs (24) may be provided, which must be interpreted by an OS-native platform-specific interpreter (25), such as Java™ programs. In the case of a web server, a web server suite (26) such as IBM's WebSphere enterprise server, or the well known Apache HTTP server, is provided. Such a web server suite (26) often includes communications protocols necessary to provided networked services, such as HTTP and WAP protocols. These types of web server suites are also extensible through additions of plug-ins and scripts (27), which allows for customized functionality of the server.

The computing device is often provided with an operating system (20), such as IBM OS/2 ™, IBM AIX™, UNIX, LINUX, MAC OS™, Solaris™, Microsoft Windows™, or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (21) are often provided to allow the operating system (20) and programs to interface to and control the specific hardware functions provided with the computing platform.

Additionally, one or more embedded firmware programs (22) are commonly provided with many computing platforms, which are executed by onboard or "embedded" microprocessors as part of the peripheral device, such as a micro controller or a hard drive, a communication processor, network interface card, or sound or graphics card.

As such, FIGS. 1 and 2 describe in a general sense the various hardware components, software and firmware programs of a wide variety of computing platforms, including but not limited to personal computers, PDAs, PIMs, web-enabled telephones, and other appliances such as WebTV™ units.

We now turn our attention to disclosure of the present invention relative to the processes and methods preferably implemented as software and firmware on such a computing platform in conjunction with a web server suite, and preferrably in conjunction with a search engine program. It will be readily recognized by those skilled in the art that the following methods and processes may be alternatively realized as hardware functions, in part or in whole, without departing from the spirit and scope of the invention.

Figure 3:
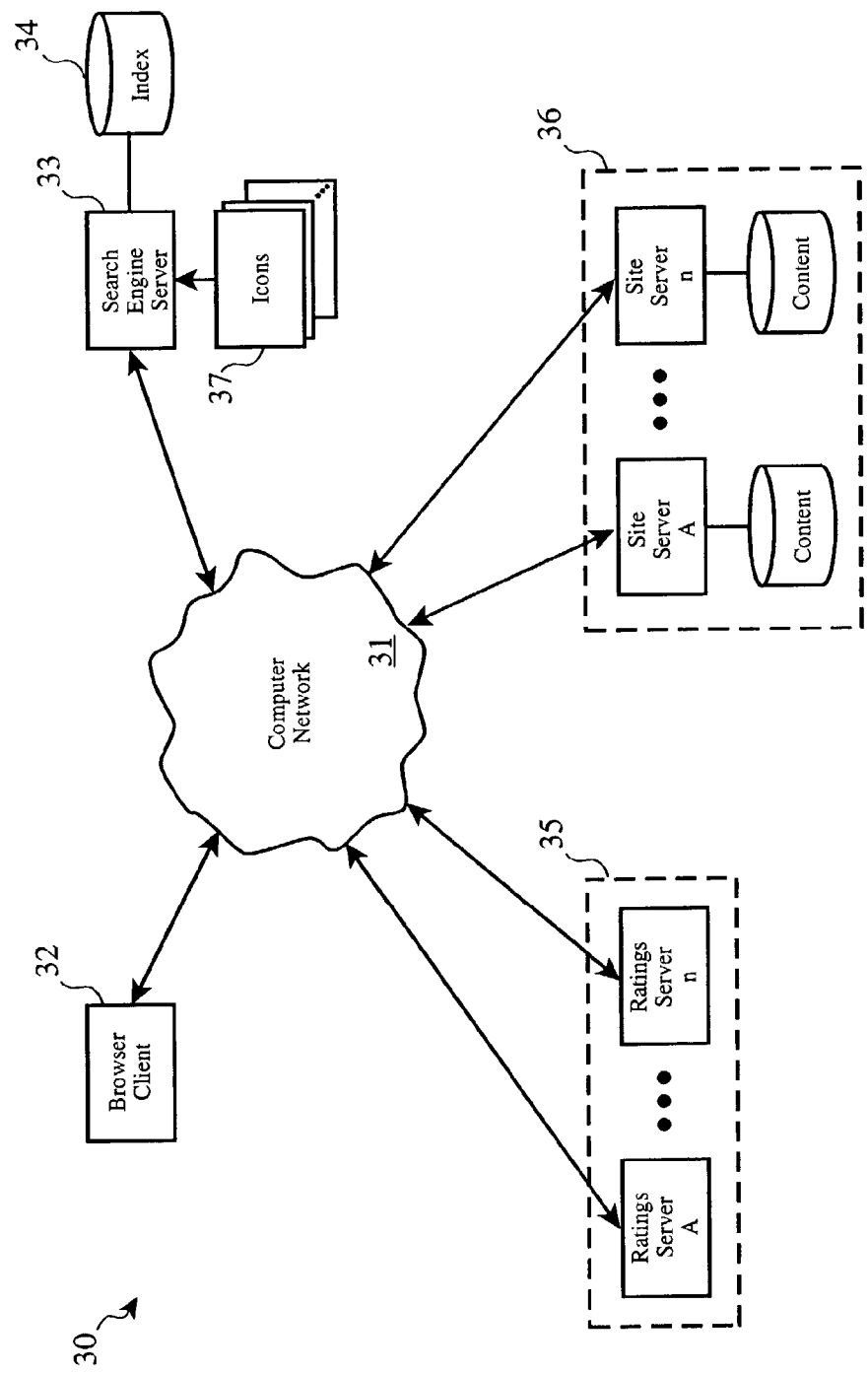
FIG. 3 illustrates the organization of systems according to the invention, including a web browser, an enhanced search engine server, one or more linked sited servers, and one or more ratings servers.

FIG. 3 shows the organization (30) of a web browser client computer (32), an search engine server (33) according to the invention, one or more linked web site server (36), and one or more ratings servers (35), all of which are communicably interconnected via computer network (31). The web browser client (32) may be one of many types of web browser devices, including a personal computer, PDA or wireless telephone as previously discussed. The computer network (31) may include the Internet, intranets, local area networks, and wireless networks.

Further, the linked site servers may be any web servers which are accessible by both the browser client (32) and the search engine server (33) via the computer network (31) using web addresses, Universal Resource Locators ("URLs"), Internet Protocol ("IP") addresses, or the like. Each site server provides content, which is indexed by the search engine server (33).

Additionally, the ratings servers (35) may be integral to the search engine server, or may be separately accessible ratings servers such as business and consumer protection services (e.g. BBBOnline™ by the Better Business Bureau), adult and pornography rating and filtering services (e.g. Net Nanny™, CYBERsitter™, and CyberPatrol™), and privacy and identity theft review services (e.g. BBBOnline and TRUSTe online trustability programs). If separate ratings servers are integrated into the invention, suitable remote query interfaces such as remote database query protocols such as remote structured query language ("SQL"), or electronic data interchange ("EDI") protocols such as ANSI's X12 are preferably employed. For the purposes of this disclosure, we will refer to these types of ratings servers as "co-opted" servers, implying use of their contained information by permission and in coordination with their operators.

The enhanced search engine server (33) comprises the software and hardware functionality of a standard search engine server, preferably, including the ability to perform searches of its indexed (34) linked sites (36) by keyword, phrases, hierarchical categorization, and query by example ("QBE"). The search engine server (33) is also provided with a set of icons or symbol images which can be associated with items in a search results page in order to indicate the characteristics of a linked site, as will be explained in more detail in the following paragraphs. Additionally, the search engine index (34) is modified and enhanced to record these characteristic factors for each indexed linked site, including but not limited to the factors of the site:

(a) requires subscription;
(b) requires a login or password for access;
(c) uses cookies or other session tracking methods;
(d) effectively uses encryption to protect privacy and personal information;
(e) uses Java;
(f) requires a special browser plug-in;
(g) spawns an excessive number of browser windows or panes;
(h) has been certified or reviewed by an independent reviewing authority;
(i) is family-friendly;
(j) contains material inappropriate for minors or other objectionable material;
(k) is a common "click through" selection by other users of the search engine (e.g. is an apparently popular site);
(l) sponsored or operated by a government agency or institution;
(m) operated by a bonafide charity;
(n) is slow to load either due to heavy use of graphics or historically slow site server response times;
(o) is a home page or a "deep linked" page; and
(p) republishes material from other sites.

Figure 6:
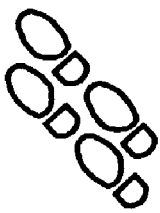
FIG. 6 provides some examples of icons used for representing linked site characteristics.
Figure 6:
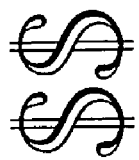
Figure 6:
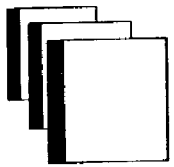
Figure 6:
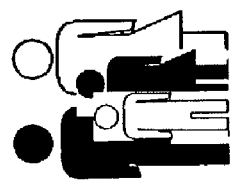
Figure 6:
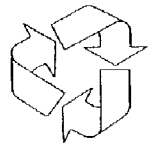
Figure 6:
Figure 6:
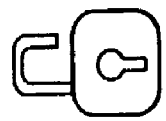

Certainly, other factors may be of interest to providing to a search engine user, and as culture and government regulations evolve and develop for online web site content, other factors may become mandatory. It is within the skill of the those in the art to develop appropriate and meaningful icons or symbols for such factors, a few examples of which are provided in FIG. 6, including a symbol for a site which requires a password (6a), a site which republishes materials from another site (6b), a site which spawns a number of browser windows or frames (6c), a site which uses cookies or session tracking methods (6d), a site certified by an independent authority (6e), and family-friendly site (6f), and a site which requires subscription for a fee (6g).

Figure 4:
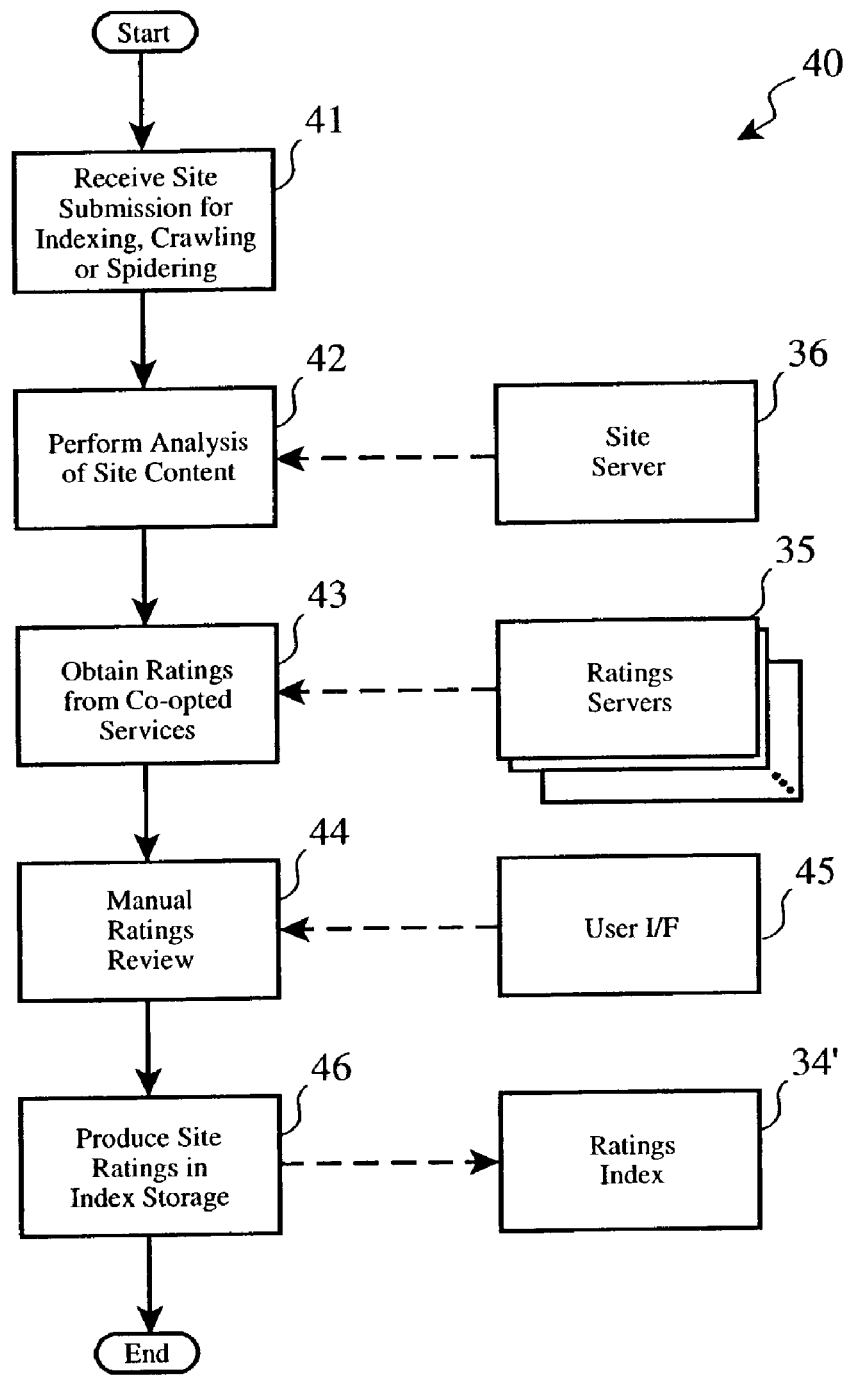
FIG. 4 sets forth the logical process of the invention for creating ratings and characteristics for linked sites.

Turning now to FIG. 4, the process (40) of associating characteristic factors with linked sites is presented. When a search engine receives (41) an initial submission for indexing content from a linked site (or upon re-indexing of a previously indexed linked site), the actual content of the linked site is analyzed (42) by retrieving one or more pages and web objects from the linked site server (36). Well-known processes such as word statistical analysis can be used to determine the keywords to be indexed to the site. Keyword lists may be used to categorize the content of the site, such as family-oriented, adult, etc. Additionally, the code content of the site, including Java scripts, HTML "includes", links and redirection commands can be found to determine if a site spawns additional browser frames, republishes information from other sites, or redirects a browser to another site (which may be indexed as well). Techniques for performing such analysis are well known in the art, and according to the invention, they are adapted to provide these additional analyses results for associating in the index with the linked site.

The ratings for the linked site and potentially for any sites from which the linked site republishes information are obtained (43) from one or more co-opted servers, as well. These ratings are added to the characteristic factors determined during the automatic analysis (42) of the site's content. If a discrepancy is found (e.g. the site's content indicates BBBOnline approval but the BBBOnline database indicates it is not approved), a manual ratings review may be performed (44) during which the characteristic factors may be adjusted using an appropriate administrator's user interface (45).

The accumulated and/or adjusted characteristic factors are then stored in or associated with (46) the rest of the "normal" search engine's index (34) in a ratings index (34'), which can be subsequently managed similarly to other system resources on the search engine server.

Figure 5:
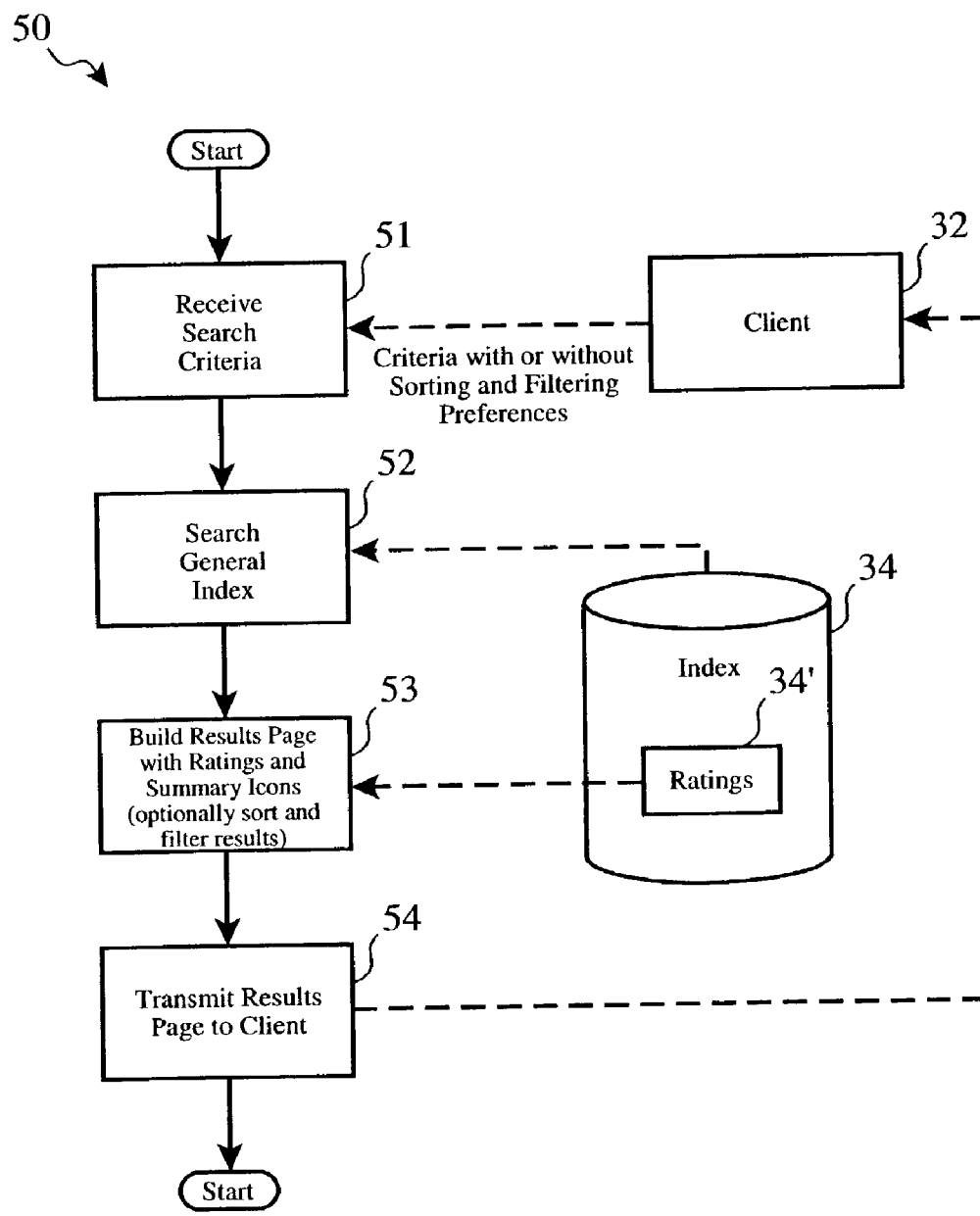
FIG. 5 sets forth the logical process of the invention for providing search results with iconic representation of linked site characteristics.

Turning now to FIG. 5, the logical process (50) of the invention during operation in cooperation with a search process is shown. When a set of search criteria is received (51) from a client computer (32) such as a set of keywords, phrases, or QBE example, the search engines general index (34) is searched (52). The ratings index (34') is accessed for each results item (e.g. for each "hit"), and a results page is created with the summaries and one or more associated characteristics icons or symbols for each result item. This icon-enhanced results page is then transmitted (54) to the requesting client (32).

Of course, the processes of FIGS. 4 and 5 could be merged, or otherwise modified to provide for "realtime" updating of each linked site when a "hit" is made during a search, by dynamically consulting the co-opted ratings servers and/or dynamically performing the content analysis.

According to the preferred embodiment, the enhanced results page provides hyperlinks associated with the characteristic icons such that the user may click on a given icon to receive a detailed explanation of the meaning of the icon. Further according to the preferred embodiment, "fly over" information is encoded into the results page such that movement of a cursor or pointer over a particular icon causes a pop-up information box or string, such as "Uses Cookies" when the cursor is over the anonymous session tracking icon (6d) of FIG. 6.

In an enhanced embodiment of the invention, the user may use a dialog box or other user interface method to select certain icons for characteristic-based priority sorting or filtering for subsequent searches, and especially for narrower searches. For example, a user could next select the third-party certification icon (6e) has as a preferred (higher sort priority) characteristic, and the cookies icon (6d) as a characteristic to filter and reject sites. These filter preferences can then be transmitted to the search engine by the client (32) for subsequent, narrower searches. The filter preferences may also be stored on the client (or at the server on behalf of the client) so that they can automatically be transmitted and used for initial, new search sessions. For example, if a user never wants to see any links which lead to sites deemed to have objectionable material or not to be family-friendly, this preference may be stored (e.g. a cookie) and submitted with all initial criteria sets (FIG. 5) sent by the client (32) to the server criteria receiver (51). This would effectively eliminate all future search results having those characteristics from being shown in the results pages.

In another sorting and filtering example, the user may prefer to have third-party certified sites sorted to the top of the list of all future searches. So, the preference would be persistently stored and submitted with future initial search criteria from the client (32) to the server criteria receiver (51), and the initial results page would be sorted and arranged accordingly.

Figure 7:
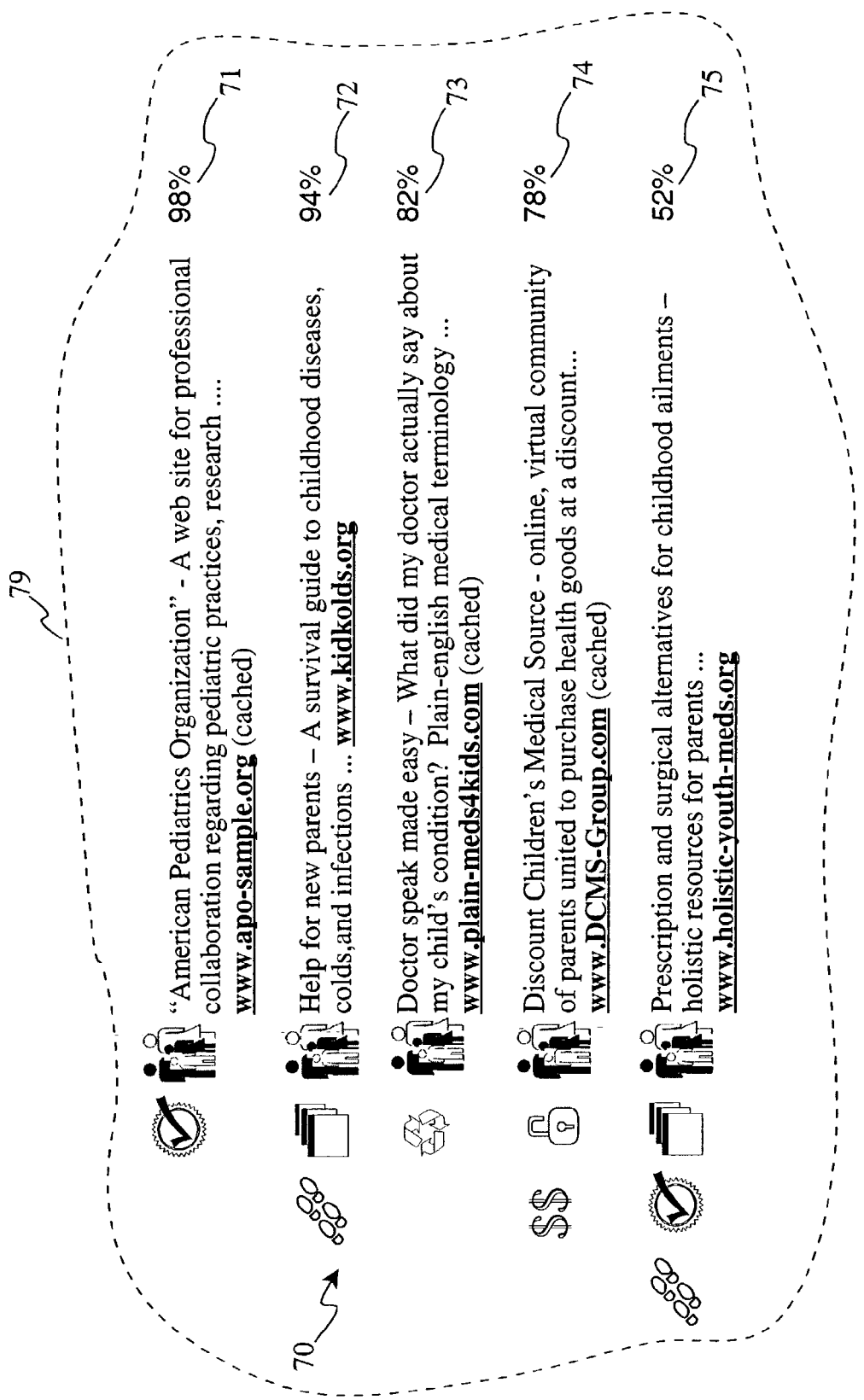
FIG. 7 shows an example of an enhanced search results page with iconic representations of linked site characteristics.

FIG. 7 provides an example results page according to the invention which may be shown on a portion of a computer display (79), in which a search for sites regarding child health care was performed. In this example, five results items or "hits" (71–75) are given, each with a short summary or the first few words for the linked site page, a relevance score, and a URL. As per typical search engine results, these results are sorted by degree of relevance, and assuming that no sorting or filtering preferences according to the invention have been set or specified yet.

Additionally, though, a number of icons (70) representing the characteristics of each linked site are provided in a visual arrangement which allows a user to associate them with the results items. In this example, the first (and most relevant) result item is shown to be family friendly and certified by a third party. The second item is shown to be family friendly, but also known to use session tracking and to spawn additional browser frames. Likewise, the third results item is shown to be family friendly, and to republish information from other web sites.

The fourth results item is also family friendly, but is accessible by subscription and through use of a login or password. Right away, the user can see that clicking on this item will be a waste of his or her time unless he or she is willing to register and sign-up for the site's service. According to the previously available technology, the user would have to actually spend the time to visit this linked site to discover this undesirable characteristic of the site.

The fifth results item shows to be family-friendly and third-party certified, but also to use session tracking and to spawn additional browser frames. The usefulness and efficiency of the enhanced web page is evident from this example, which clearly will save the user time in clicking-through to several of these references which would eventually be discovered to have undesirable characteristics, and would require returning to the results page for additional exploration of the other results items.

Figure 8:
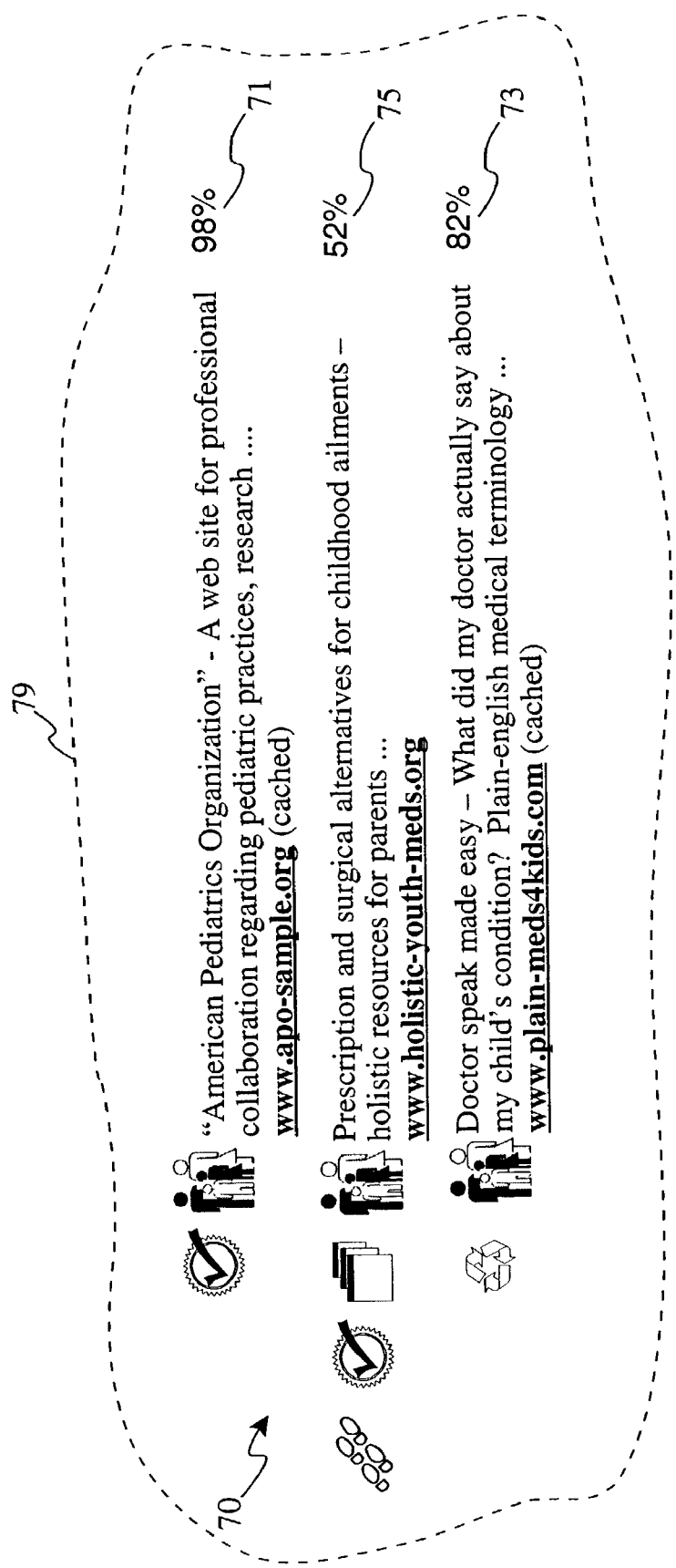
FIG. 8 shows an example of a filtered and sorted enhanced search results page with iconic representations of linked site characteristics.

FIG. 8 shows a subsequent search results page after a user has specified preferred characteristics and characteristics for filtering. In this example, the user has indicated a preference for third-party certified sites, and a filter for subscription sites. As such, the results are ordered (e.g. sorted) according to these preferences, and secondarily according to relevance. If the user has selected to persistently use these filter and sorting preferences, FIG. 8 may actually represent an initial results page, as previously described.

In summary, the invention has been disclosed as methods and components to be associated with search engine servers. The invention can be realized in conjunction with a wider variety of server technologies which provide links to other web sites, including but not limited to online "e-communities", online malls, etc. As such, it will be recognized by those skilled in the art that certain substitutions and variations from the disclosed embodiments and examples may be made without departing from the spirit and scope of the invention, including use of alternate computing platforms, operating systems, protocols, and programming methodologies. The scope of the present invention should, therefore, be determined by the following claims.

What is claimed is:

1. A method for indicating characteristics of a plurality of linked sources of information comprising the steps of:
    performing an analysis of code content of each linked source of information to determine if portable language scripts are employed, if markup language include commands are employed, if embedded links spawn additional web browser frames, and if embedded links redirect a web browser;
    establishing characteristic factors for each linked source of information according to said analysis of said information;
    co-opting a plurality of content ratings services via an electronic communication interface selected from the group electronic data interchange protocol and structured query language protocol;
    responsive to determination of a discrepancy between one or more ratings services and said established characteristic factors, prompting a user to perform a supplemental analysis;
    responsive to input to from a user, updating said characteristic factors according to said supplemental analysis;
    providing a plurality of iconic symbols, each iconic symbol representing a characteristic factor; and
    responsive to a search engine query, producing a list of said linked sources, said list comprising one or more iconic symbols associated with each reference to said linked sources, said icons indicating one or more functional characteristics of said linked information selected from the group of characteristic factors of session tracking employed, third-party certified, subscription required, login required, password required, encryption employed, spawns additional browser frames, slow to load, deep-linked source, redirects access, and republishes information source.

2. The method as set forth in claim 1 wherein said step of producing a list comprises producing a hypertext markup language list.

3. The method as set forth in claim 2 wherein said step of producing a hypertext markup language list comprises providing "fly over" information for each iconic symbol.

4. The method as set forth in claim 2 wherein said step of producing a hyper text markup language list comprises providing a hyperlink to an explanation page for each iconic symbol.

5. The method as set forth in claim 1 further comprising the steps of:
    receiving a set of sort and filter preferences from a user; and
    producing a modified list of linked sources sorted and filtered according to said user preferences.

6. The method as set forth in claim 1 further comprising the step of storing said sort and filter preferences for use in subsequent production of lists of linked sources.

7. A computer readable medium encoded with software for indicating characteristics of a plurality of linked sources of information, said software when executed by a networked server performing the steps of:

performing an analysis of code content of each linked source of information to determine if portable language scripts are employed, if markup language include commands are employed, if embedded links spawn additional web browser frames, and if embedded links redirect a web browser;

establishing characteristic factors for each linked source of information according to said analysis of said information;

co-opting a plurality of content ratings services via an electronic communication interface selected from the group electronic data interchange protocol and structured query language protocol;

responsive to determination of a discrepancy between one or more ratings services and said established characteristic factors, promoting a user to perform a supplemental analysis;

responsive to input to from a user, updating said characteristic factors according to said supplemental analysis;

providing a plurality of iconic symbols, each iconic symbol representing a characteristic factor; and responsive to a search engine query, producing a list of said linked sources, said list comprising one or more iconic symbols associated with each reference to said linked sources, said icons indicating one or more functional characteristics of said linked information selected from the group of characteristic factors of session tracking employed, third-party certified, subscription required, login required, password required, encryption employed, spawns additional browser frames, slow to load, deep-linked source, redirects access, and republishes information source.

8. The computer readable medium as set forth in claim 7 wherein said software for producing a list comprises software for producing a hyper text markup language list.

9. The computer readable medium as set forth in claim 8 wherein said software for producing a hypertext markup language list comprises software for providing "fly over" information for each iconic symbol.

10. The computer readable medium as set forth in claim 8 wherein said software for producing a hyper text markup language list comprises software for providing a hyperlink to an explanation page for each iconic symbol.

11. The computer readable as set forth in claim 7 further comprising software for performing the steps of:

receiving a set of sort and filter preferences from a user; and producing a modified list of linked sources sorted and filtered according to said user preferences.

12. The computer readable medium as set forth in claim 11 further comprising software for storing said sort and filter preferences for use in subsequent production of lists of linked sources.

13. A system for providing icon characteristic representations of content provided by linked servers, said system comprising:

a first interface to one or more linked servers for retrieving content from said linked servers;

a second interface to a plurality of co-opted ratings servers for retrieving ratings regarding content of said linked servers, said second interface being configured to communicate via a protocol selected from the group of electronic data interchange protocol and structured query language protocol;

a code content analyzer adapted to analyze code content of each linked source of information to determine if portable language scripts are employed, if markup language include commands are employed, if embedded links spawn additional web browser frames, and if embedded links redirect a web browser;

a user prompt to perform a supplemental analysis responsive to determination of a discrepancy between one or more ratings services and said established characteristic factors for a information source;

updated characteristic factors according to said supplemental analysis responsive to input to from a user;

a set of icons, each of which represents a content characteristic; and a linked server reference list generator adapted to analyze said linked server content via said first interface, to collect ratings from said co-opted ratings server via said second interface, and to produce a linked server reference list having one or more icons associated with each reference in said list, said icons indicating one or more functional characteristics of said linked information selected from the group of characteristic factors of session tracking employed, third-party certified, subscription required, login required, password required, encryption employed, spawns additional browser frames, slow to load, deep-linked source, redirects access, and republishes information source.

14. The system as set forth in claim 13 wherein said first interface comprises an Internet interface.

15. The system as set forth in claim 13 wherein said second interface comprises an Internet interface.

16. The system as set forth in claim 13 wherein said icons comprise graphic web objects.

17. The system as set forth in claim 16 wherein said graphic web objects include fly-over information messages.

18. The system as set forth in claim 16 wherein said graphic web objects include hyperlinks to explanation messages.

19. The system as set forth in claim 13 further comprising a linked server reference list sorter and filter adapted to sort references and remove filtered references in said list by preferences established by a user.

20. The system as set forth in claim 19 further comprising a persistent user preference setting for use in sorting and filtering subsequent reference lists.

* * * * *